(12) United States Patent
Inskip

(10) Patent No.: US 11,032,589 B1
(45) Date of Patent: Jun. 8, 2021

(54) METHODS, SYSTEMS, AND MEDIA FOR ENSURING CONSUMPTION OF PORTIONS OF MEDIA CONTENT

(71) Applicant: Google LLC, Mountain View, CA (US)

(72) Inventor: Thomas Inskip, Seattle, WA (US)

(73) Assignee: Google LLC, Mountain View, CA (US)

( * ) Notice: Subject to any disclaimer, the term of this patent is extended or adjusted under 35 U.S.C. 154(b) by 214 days.

(21) Appl. No.: 15/473,291

(22) Filed: Mar. 29, 2017

Related U.S. Application Data

(60) Provisional application No. 62/372,580, filed on Aug. 9, 2016.

(51) Int. Cl.
| | |
|---|---|
| *H04N 21/2347* | (2011.01) |
| *H04N 21/4405* | (2011.01) |
| *H04N 21/4408* | (2011.01) |
| *H04N 21/254* | (2011.01) |
| *H04N 21/81* | (2011.01) |

(52) U.S. Cl.
CPC ..... *H04N 21/2347* (2013.01); *H04N 21/2541* (2013.01); *H04N 21/4408* (2013.01); *H04N 21/812* (2013.01)

(58) Field of Classification Search
CPC .......... H04N 21/2347; H04N 21/2541; H04N 21/4408
See application file for complete search history.

(56) References Cited

U.S. PATENT DOCUMENTS

| | | | | |
|---|---|---|---|---|
| 6,865,555 B2* | 3/2005 | Novak | ............. | H04N 21/47202 705/59 |
| 9,805,211 B2* | 10/2017 | Agrawal | ............. | G06F 21/6218 |
| 2002/0150244 A1* | 10/2002 | Kim | ........................ | H04N 5/913 380/201 |
| 2004/0052377 A1* | 3/2004 | Mattox | .................. | H04N 7/163 380/277 |
| 2007/0098165 A1* | 5/2007 | Yoshikawa | ........ | H04N 21/8352 380/211 |
| 2007/0130068 A1* | 6/2007 | Kitazato | ............ | H04N 21/2541 705/50 |
| 2008/0019516 A1* | 1/2008 | Fransdonk | ........... | H04N 7/1675 380/201 |

(Continued)

OTHER PUBLICATIONS

DASH Industry Forum, "Guidelines for Implementation: DASH-IF Interoperability Points", in Proceedings of DASH Industry Forum, Dec. 24, 2015, pp. 1-147.

(Continued)

*Primary Examiner* — Brian T Pendleton
*Assistant Examiner* — Frank Johnson
(74) *Attorney, Agent, or Firm* — Byrne Poh LLP

(57) ABSTRACT

In some embodiments, a method for controlling access to media is provided, the method comprising: receiving an encrypted media content stream from a media content source that includes first media content corresponding to at least a portion of a media content item; requesting a second media content stream that includes second media content having a playback position adjacent to the first media content, wherein the second media content stream includes key information for decrypting the encrypted media content stream; decrypting the encrypted media content stream using the key information included in the second media content stream; and causing the decrypted media content stream to be presented.

12 Claims, 4 Drawing Sheets

(56) References Cited

U.S. PATENT DOCUMENTS

| | | | | |
|---|---|---|---|---|
| 2008/0104632 | A1* | 5/2008 | Kwon | H04N 7/163 725/32 |
| 2009/0204541 | A1* | 8/2009 | Zhuk | H04L 63/0428 705/50 |
| 2010/0128878 | A1* | 5/2010 | Lee | G06F 21/10 380/278 |
| 2010/0198687 | A1* | 8/2010 | Bang | G06F 21/10 705/14.53 |
| 2011/0247027 | A1* | 10/2011 | Davis | H04N 21/63345 725/5 |
| 2012/0224689 | A1* | 9/2012 | Rodgers | H04N 21/8355 380/255 |
| 2012/0331293 | A1* | 12/2012 | Ma | H04N 21/2387 713/168 |
| 2014/0270161 | A1* | 9/2014 | Shamsaasef | H04N 21/4405 380/44 |
| 2014/0331053 | A1* | 11/2014 | Maruyama | H04L 9/0825 713/175 |
| 2015/0033023 | A1* | 1/2015 | Xu | H04L 9/3247 713/176 |
| 2016/0070887 | A1* | 3/2016 | Wu | G06F 21/84 713/189 |
| 2016/0087944 | A1* | 3/2016 | Downey | G06F 21/10 713/168 |
| 2016/0364551 | A1* | 12/2016 | Bouazizi | G06F 21/10 |
| 2017/0230716 | A1* | 8/2017 | Kim | H04L 9/32 |

OTHER PUBLICATIONS

Pantos, R. et al., "HTTP Live Streaming", Independent Submission, Aug. 2017, available at: https://datatracker.ietf.org/doc/rfc8216/, pp. 1-60.

* cited by examiner

METHODS, SYSTEMS, AND MEDIA FOR ENSURING CONSUMPTION OF PORTIONS OF MEDIA CONTENT

CROSS-REFERENCE TO RELATED APPLICATION

This application claims the benefit of U.S. Provisional Patent Application No. 62/372,580, filed Aug. 9, 2016, which is hereby incorporated by reference herein in its entirety.

TECHNICAL FIELD

The disclosed subject matter relates to methods, systems, and media for ensuring consumption of portions of media content.

BACKGROUND

In recent years, the amount of user-generated and professionally-produced content that is available through advertising-supported streaming platforms has been increasing. Using such platforms, a user can access and request media content, such as content produced for broadcast and/or subscription television that is then delivered to a user device, such as a personal computer or a digital media receiver, over public and private networks. Before and/or in the middle of the requested content, an advertisement is delivered to the user device, which then typically presents the advertisement before receiving a subsequent portion of the requested content. However, tools may be developed that allow some users to circumvent this arrangement and skip the advertisements, which could undermine the economic model of such advertising-supported streaming platforms if it becomes widespread. These tools, for example, can access a document (e.g., a media manifest transmitted with the content stream) that indicates to the user device when certain content streams and when certain advertisement streams are to be requested and presented. In such an example, the user device can be instructed to skip the part of the document that instructs the user device to request an advertisement stream, or the document can be edited to remove the instructions that cause the user device to request the advertisement stream.

Accordingly, it is desirable to provide new methods, systems, and media for ensuring consumption of portions of media content.

SUMMARY

In accordance with various embodiments of the disclosed subject matter, methods, systems, and media for ensuring consumption of portions of media content.

In accordance with some embodiments of the disclosed subject matter, a method for ensuring media consumption is provided, the method comprising: receiving, using a hardware processor, an encrypted media content stream from a media content source that includes first media content corresponding to at least a portion of a media content item; requesting a second media content stream that includes second media content having a playback position adjacent to the first media content, wherein the second media content stream includes key information for decrypting the encrypted media content stream; decrypting the encrypted media content stream using the key information included in the second media content stream; and causing the decrypted media content stream to be presented.

In accordance with some embodiments of the disclosed subject matter, a system for ensuring media consumption is provided, the system comprising: a memory; and a hardware processor that, when executing computer-executable instruction stored in the memory, is programmed to: receive an encrypted media content stream from a media content source that includes first media content corresponding to at least a portion of a media content item; request a second media content stream that includes second media content having a playback position adjacent to the first media content, wherein the second media content stream includes key information for decrypting the encrypted media content stream; decrypt the encrypted media content stream using the key information included in the second media content stream; and cause the decrypted media content stream to be presented.

In accordance with some embodiments of the disclosed subject matter, a non-transitory computer-readable medium containing computer executable instructions that, when executed by a processor, cause the processor to perform a method for ensuring media consumption is provided, the method comprising: receiving an encrypted media content stream from a media content source that includes first media content corresponding to at least a portion of a media content item; requesting a second media content stream that includes second media content having a playback position adjacent to the first media content, wherein the second media content stream includes key information for decrypting the encrypted media content stream; decrypting the encrypted media content stream using the key information included in the second media content stream; and causing the decrypted media content stream to be presented.

In accordance with some embodiments of the disclosed subject matter, a system for ensuring media consumption is provided, the system comprising: means for receiving an encrypted media content stream from a media content source that includes first media content corresponding to at least a portion of a media content item; requesting a second media content stream that includes second media content having a playback position adjacent to the first media content, wherein the second media content stream includes key information for decrypting the encrypted media content stream; decrypting the encrypted media content stream using the key information included in the second media content stream; and causing the decrypted media content stream to be presented.

In some embodiments, the key information included in the second media content stream includes encrypted content key information.

In some embodiments, the system further comprises: means for requesting a media license corresponding to the media content item; and means for decrypting the encrypted content key information included in the second media content stream using a key from the requested media license to obtain decrypted content key information, wherein the decrypted media content stream is obtained by decrypting the encrypted media content stream using the decrypted content key information.

In some embodiments, the media license is requested from a digital rights management system and wherein the second media content stream is an advertisement stream requested from an advertising source.

In some embodiments, the second media content stream is streamed using the MPEG Dynamic Adaptive Streaming Over HTTP protocol and wherein the key information is contained in a Protection System Specific Header box included in the second media content stream.

In some embodiments, the key information is included at a particular location within the second media content stream and wherein the particular location corresponds to a portion towards an end portion of the second media content.

In some embodiments, the system further comprises: means for receiving a request for a media content item; means for requesting the media content item from the media content source; means for receiving an unencrypted third media content stream from the media content source that includes third media content corresponding to at least a portion of the requested media content item in response to the request for the media content item, wherein the third media content is to be presented prior to presentation of the first media content and wherein the first media content is to be presented after presentation of the second media content; and means for causing the third media content to be presented by a display.

In accordance with some embodiments of the disclosed subject matter, a method for ensuring media consumption is provided, the method comprising: requesting, using a hardware processor, a media content item from a media content source; in response to the request for the media content item, receiving a first media content stream from the media content source that includes first media content corresponding to at least a first portion of the requested media content item; causing the first media content to be presented by a display; receiving a second media content stream that includes second media content, wherein the second media content stream includes key information for third media content corresponding to at least a second portion of the media content item to be presented after presentation of the second media content; causing the second media content to be presented by the display; receiving a third media content stream from the media content source that includes the third media content corresponding to at least a second portion of the requested media content item, wherein the third media content is encrypted; decrypting the third media content using a key obtained using at least a portion of the key information included in the second media content stream; and causing the decrypted third media content to be presented by the display.

In some embodiments, a system for ensuring media consumption is provided, the system comprising: a hardware processor that is programmed to: request a media content item from a media content source; in response to the request for the media content item, receive a first media content stream from the media content source that includes first media content corresponding to at least a first portion of the requested media content item; cause the first media content to be presented by a display; receive a second media content stream that includes second media content, wherein the second media content stream includes key information for third media content corresponding to at least a second portion of the media content item to be presented after presentation of the second media content; cause the second media content to be presented by the display; receive a third media content stream from the media content source that includes the third media content corresponding to at least a second portion of the requested media content item, wherein the third media content is encrypted; decrypt the third media content using a key obtained using at least a portion of the key information included in the second media content stream; and cause the decrypted third media content to be presented by the display.

In some embodiments, a non-transitory computer-readable medium containing computer executable instructions that, when executed by a processor, cause the processor to perform a method for ensuring media consumption is provided, the method comprising: requesting a media content item from a media content source; in response to the request for the media content item, receiving a first media content stream from the media content source that includes first media content corresponding to at least a first portion of the requested media content item; causing the first media content to be presented by a display; receiving a second media content stream that includes second media content, wherein the second media content stream includes key information for third media content corresponding to at least a second portion of the media content item to be presented after presentation of the second media content; causing the second media content to be presented by the display; receiving a third media content stream from the media content source that includes the third media content corresponding to at least a second portion of the requested media content item, wherein the third media content is encrypted; decrypting the third media content using a key obtained using at least a portion of the key information included in the second media content stream; and causing the decrypted third media content to be presented by the display.

In some embodiments, a system for ensuring media consumption is provided, the system comprising: means for requesting a media content item from a media content source; means for receiving a first media content stream from the media content source that includes first media content corresponding to at least a first portion of the requested media content item; means for causing the first media content to be presented by a display; means for receiving a second media content stream that includes second media content, wherein the second media content stream includes key information for third media content corresponding to at least a second portion of the media content item to be presented after presentation of the second media content; means for causing the second media content to be presented by the display; means for receiving a third media content stream from the media content source that includes the third media content corresponding to at least a second portion of the requested media content item, wherein the third media content is encrypted; means for decrypting the third media content using a key obtained using at least a portion of the key information included in the second media content stream; and means for causing the decrypted third media content to be presented by the display.

In some embodiments, the key information includes the content key, and the content key is encrypted.

In some embodiments, the system further comprises: means for requesting a digital rights management key from a digital rights management system; and means for decrypting the content key using the digital rights management key.

In some embodiments, the second media content stream is streamed using the MPEG Dynamic Adaptive Streaming Over HTTP protocol.

In some embodiments, the key information is included in a Protection System Specific Header box included in the second media content stream.

In some embodiments, the key information is included at a particular location within the second media content stream.

In some embodiments, the location corresponds to a portion of the second media content closer to the end of the second media content than to the beginning.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
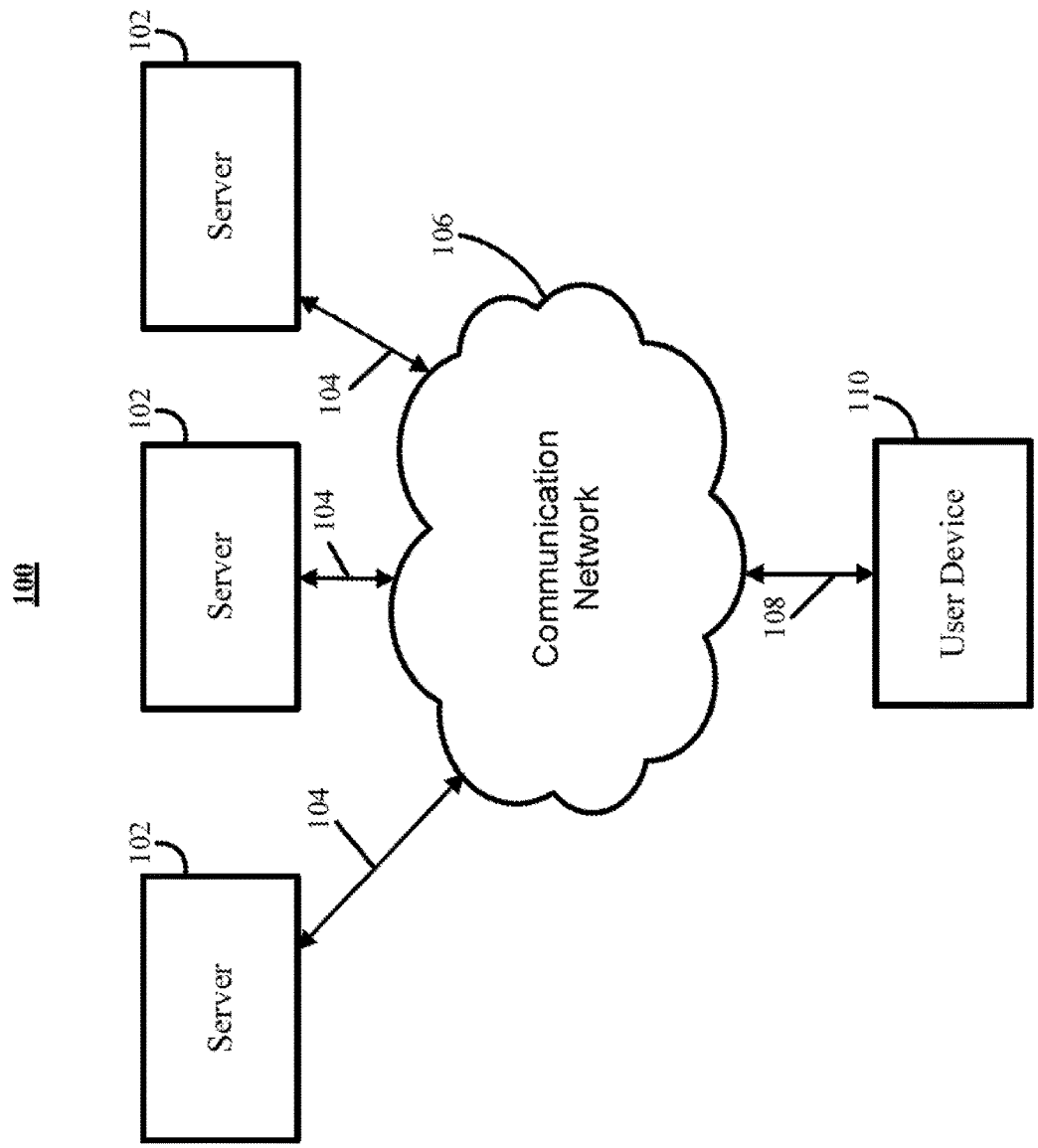
FIG. 1 shows an example of a generalized schematic diagram of a system on which the mechanisms for ensuring consumption of portions of media content as described herein can be implemented in accordance with some embodiments of the disclosed subject matter.

In accordance with various embodiments, mechanisms (which can include methods, systems, and/or media) for ensuring consumption of portions of media content are provided.

In some embodiments, the mechanisms described herein can request a media content stream corresponding to a particular media content item from a content source associated with the media content item. For example, a user device executing at least a portion of the mechanisms described herein can request an episode of a television program from a content source, which may be associated with a network that originally broadcast the episode of the television program, or may be another party (e.g., that agreed to pay licensing fees in exchange for the right to stream the episode to users).

In some embodiments, the mechanisms described herein can receive an advertisement stream after a media content stream that includes a first portion of the media content item has been received and/or presented. For example, the media content stream can include instructions that cause the user device to request an advertisement after a first portion of the episode has been presented. In another example, the media content stream can include instructions that cause the user device to request an advertisement that is presented prior to the first portion of the media content item.

In some embodiments, the mechanisms described herein can extract key information from the advertisement stream that can be used to decrypt a portion of the media content item, such as a subsequent portion of the media content item received in a subsequent media content stream. For example, the user device can extract a content key from the advertisement stream for a first or second portion of the episode.

In some embodiments, the key information included in the advertisement stream can include encrypted content key information. In some embodiments, upon determining that the content key information is encrypted, the mechanisms can request a media license that corresponds to the media content item. The media license can, for example, include a key, where the key can be used to decrypt the encrypted content key information included in the advertisement stream. Alternatively, in some embodiments, upon determining that the content key information is encrypted, the mechanisms can locate a key included in the advertisement stream, where the key can be used to decrypt the encrypted content key information included in the advertisement stream. It should be noted that, in some embodiments, the key information included in the advertisement stream can include unencrypted content key information.

Additionally to obtaining content key information (e.g., premium content stream keys) from the advertisement stream, the mechanisms can extract, from the advertisement stream, policy information corresponding to the content key information that is also included in the advertisement stream. Such policy information can, for example, define a policy on how to use the content key information—e.g., a key duration, a key expiration time, device requirements, etc. It should be noted that content key information and associated policy information can be stored in different locations within the advertisement stream. It should also be noted that content key information and associated policy information can be stored in different content streams.

In some embodiments, the mechanisms described herein can receive a second media content stream from a content source associated with the media content item, and decrypt the second media content stream using the key information extracted from the advertisement stream. For example, the user device can receive the second portion of the episode after the advertisement included in the advertisement stream is presented as another media content stream. In such an example, the second portion of the episode can be encrypted using a key that corresponds to the key extracted from the advertisement stream, such that the user device can readily decrypt the second portion of the episode if the user device received the content key included in the advertisement stream. In another example, the second portion of the episode can be encrypted using content key information having particular policy information, where the content key information and policy information from the advertisement stream. In some cases, this can prevent a user from skipping an advertisement, as skipping the advertisement would render a subsequent media content stream unusable due to the inability of the user device to decrypt the subsequent media content stream.

FIG. 1 shows an example 100 of a generalized schematic diagram of a system on which the mechanisms for ensuring consumption of portions of media content as described herein can be implemented in accordance with some embodiments of the disclosed subject matter. As illustrated, system 100 can include one or more user devices 110. User devices 110 can be local to each other or remote from each other. User devices 110 can be connected by one or more communications links 108 to a communication network 106 that can be linked to a server 102 via a communications link 104.

System 100 can include one or more servers 102. Servers 102 can be any suitable server or servers for providing access to the mechanisms described herein for ensuring consumption of portions of media content, such as a processor, a computer, a data processing device, or any suitable combination of such devices. For example, the mechanisms for ensuring consumption of portions of media content can be distributed into multiple backend components and multiple frontend components and/or user interfaces. In a more particular example, backend components, such as mechanisms for: receiving requests for media content; providing a stream of encrypted and/or unencrypted media content; providing key information to a user device (e.g., user device 110); causing user device 110 to request an advertisement (or advertisements) in connection with the provided media content; providing an advertising stream that includes key information for accessing a subsequent media content stream; etc., can be performed on one or more servers 102. In another more particular example, frontend components, such as mechanisms for: presentation of a user interface; requesting media content; presentation (e.g., using a display, speakers, etc.) of media content received as a content stream; presentation of an advertisement received as a content stream; decrypting a content stream using key information; etc., can be performed on one or more user devices 110.

In some embodiments, each of user devices 110, and server 102 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, user device 110 can be implemented as a smartphone, a tablet computer, a mobile telephone, a wearable computer, a vehicle (e.g., an automobile, a boat, an airplane, or any other suitable vehicle) entertainment system (e.g., a radio, a built-in display, etc.), a personal computer, a laptop computer, a digital media receiver, a set-top box, a smart television, a home entertainment system, a game console, any other suitable computing device, or any suitable combination thereof.

Communications network 106 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 104 and 108 can be any communications links suitable for communicating data among user devices 110 and server 102, such as network links, dial-up links, wireless links, hard-wired links, any other suitable communications links, or any suitable combination of such links. Note that, in some embodiments, multiple servers 102 can be used to provide access to different mechanisms associated with the mechanisms described herein for ensuring consumption of portions of media content. For example, system 100 can include a content delivery server that responds to requests for media content by causing the requested media content to be transmitted to user device 110 that requested the content as a stream of media content, an advertisement server that responds to requests for one or more advertisements by causing the requested advertisement(s) to be transmitted to user device 110 that requested the advertisement(s) as a stream of advertisement content; a digital rights management server that provides information that can be used to decrypt a content stream (e.g., a content stream provided by the content delivery server) in response to determining that a user device that is requesting the information is authorized to access the content, a key management server can provide key information and/or policy information that can be used to decrypt a content stream (e.g., a content stream provided by the content delivery server), any other suitable servers for performing any suitable functions of the mechanisms described herein and/or any other suitable functions, or any suitable combination thereof.

Figure 2:
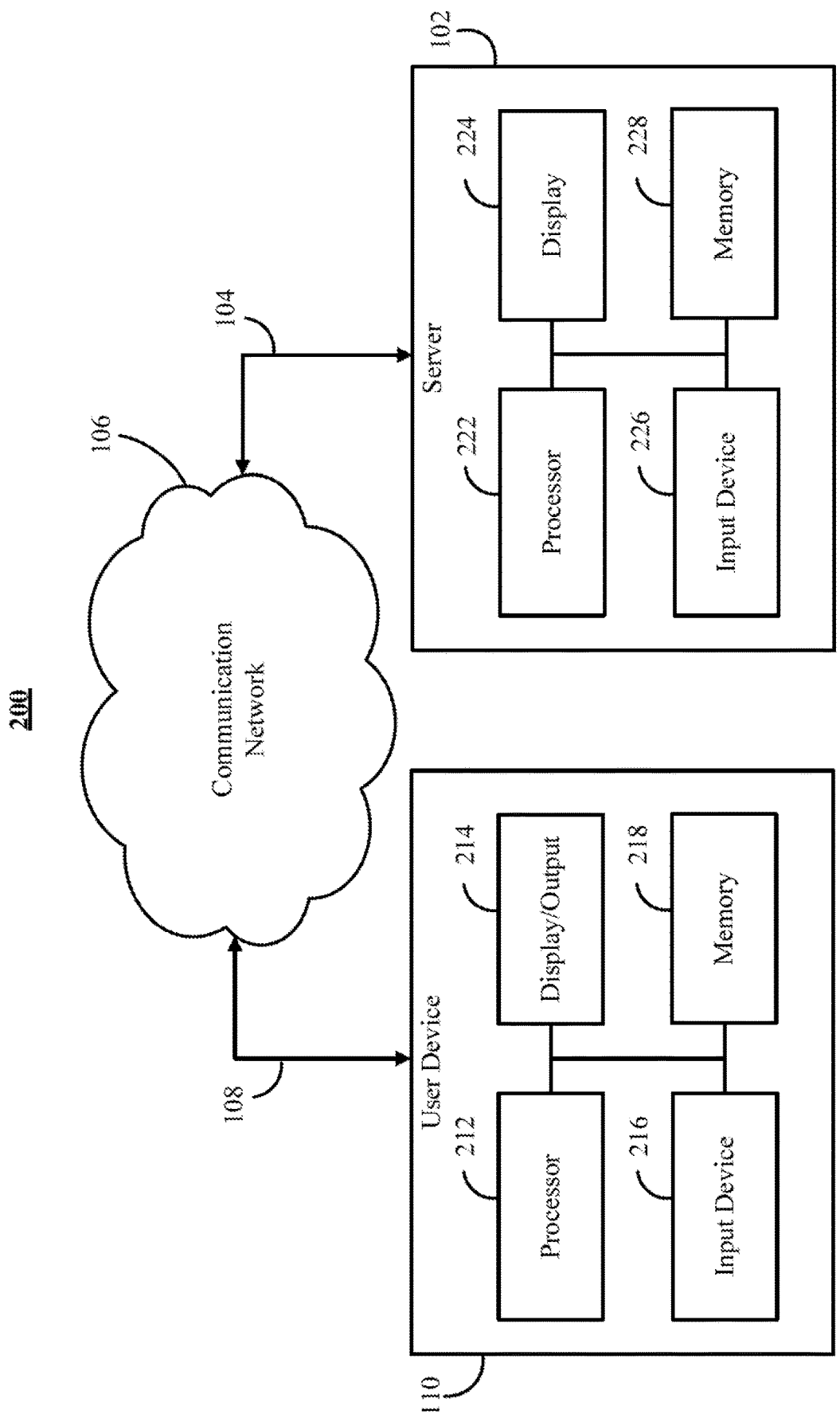
FIG. 2 shows an example of hardware that can be used to implement one or more user devices and servers depicted in FIG. 1 in accordance with some embodiments of the disclosed subject matter.

FIG. 2 shows an example 200 of hardware that can be used to implement one or more of user devices 110, and servers 102 depicted in FIG. 1 in accordance with some embodiments of the disclosed subject matter. Referring to FIG. 2, user device 110 can include a hardware processor 212, a display 214, an input device 216, and memory 218, which can be interconnected. In some embodiments, memory 218 can include a storage device (such as a non-transitory computer-readable medium) for storing a computer program for controlling hardware processor 212.

Hardware processor 212 can use the computer program to execute at least a portion of the mechanisms described herein for: initiating requests for media content; receiving a stream of media content; presenting media content and/or causing media content to be presented; initiating a request for advertising content (e.g., based on information provided with the stream of media content); receiving a stream of advertising content that includes key information that can be used (e.g., by hardware processor) to decrypt a subsequent media stream; sending and receiving data through communications link 108; and/or for performing any other suitable task associated with the mechanisms described herein. In some embodiments, hardware processor 212 can send and receive data through communications link 108 or any other communication links using, for example, a transmitter, a receiver, a transmitter/receiver, a transceiver, or any other suitable communication device. Display 214 can include a touchscreen, a flat panel display, a cathode ray tube display, a projector, a speaker or speakers, and/or any other suitable display and/or presentation devices. Input device 216 can be a computer keyboard, a computer mouse, a touchpad, a voice recognition circuit, a touchscreen, and/or any other suitable input device. In some embodiments, the computer program can cause hardware processor 212 to, for example, execute one or more portions of process 300 as described below in connection with FIG. 3.

Server 102 can include a hardware processor 222, a display 224, an input device 226, and memory 228, which can be interconnected. In some embodiments, memory 228 can include a storage device (such as a non-transitory computer-readable medium) for storing data received through communications link 104 or through other links. The storage device can further include a server program for controlling hardware processor 222. In some embodiments, memory 228 can include information stored as a result of user activity (e.g., information about a request for media content received from a particular user device, identifying information of a user device that requested media content, etc.), and hardware processor 222 can receive requests for media content from user devices 110, transmit the requested media content to user device 110, cause user device 110 to request an advertisement in connection with the media content, and cause key information that can be used to decrypt at least a portion of the media content to be transmitted to user devices 110 with an advertisement stream requested by user device 110 (e.g., as described below in connection with process 300 of FIG. 3 and data flow 400 of FIG. 4).

Hardware processor 222 can use the server program to communicate with user devices 110 and/or other servers, as well as provide access to and/or copies of mechanisms described herein. It should also be noted that data received through communications link 104 or any other communications links can be received from any suitable source. In some embodiments, hardware processor 222 can send and receive data through communications link 104 or any other communications links using, for example, a transmitter, a receiver, a transmitter/receiver, a transceiver, or any other suitable communication device. In some embodiments, hardware processor 222 can receive commands and/or values transmitted by one or more user devices 110 and/or one or more users of server 102, such as a user that makes changes to adjust settings associated with the mechanisms described herein for controlling access to media content. Display 224 can include a touchscreen, a flat panel display, a cathode ray tube display, a projector, a speaker or speakers, and/or any other suitable display and/or presentation devices. Input device 226 can be a computer keyboard, a computer mouse, a touchpad, a voice recognition circuit, a touchscreen, and/or any other suitable input device.

In some embodiments, server 102 can be implemented in one server or can be implemented as any suitable number of servers. For example, multiple servers 102 can be implemented in various locations to increase reliability and/or increase the speed at which the server can communicate with user devices 110. Additionally or alternatively, as described above in connection with FIG. 1, multiple servers 102 can be used to perform different tasks associated with the mechanisms described herein.

Figure 3:
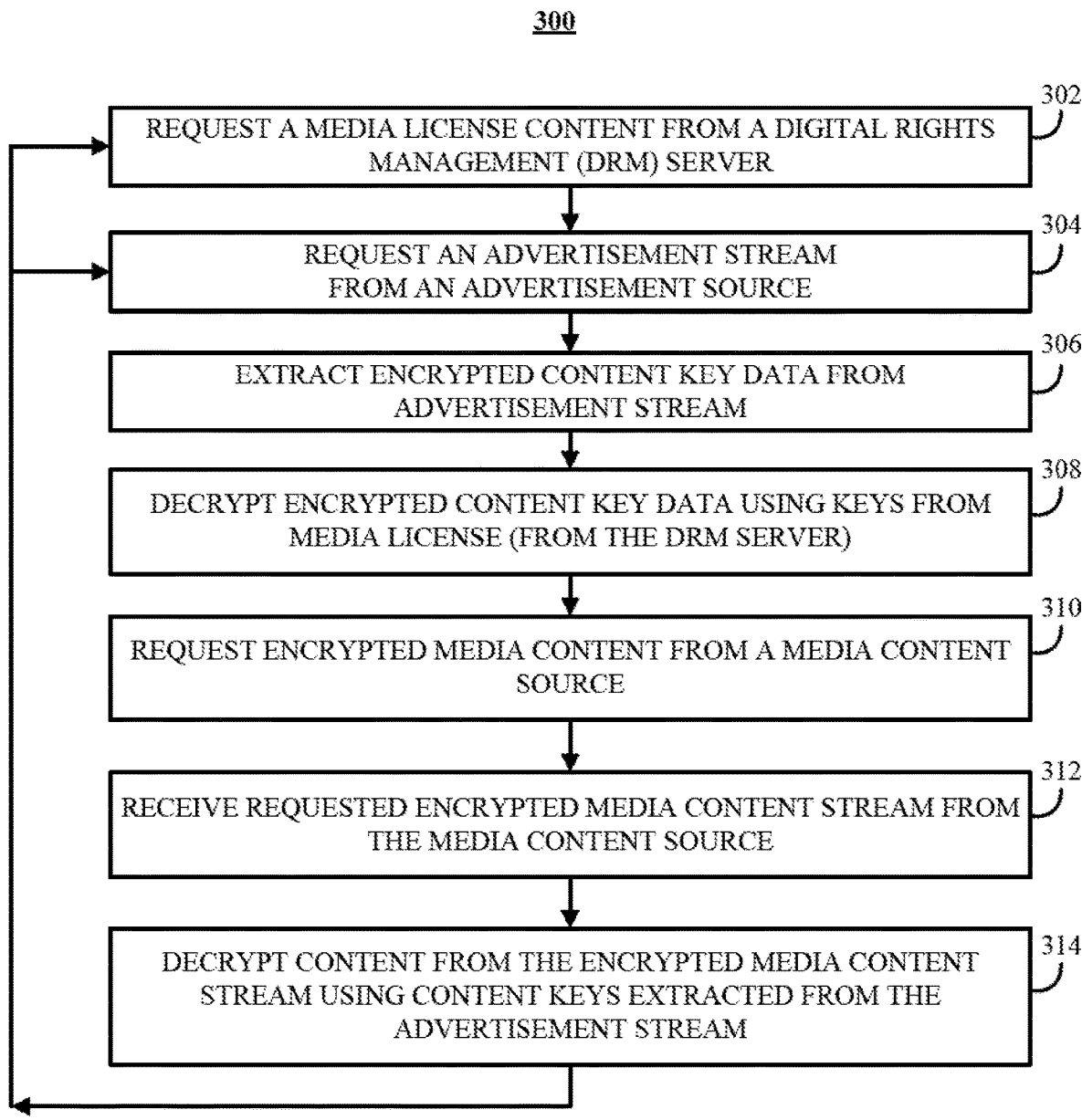
FIG. 3 shows an example of a process for ensuring consumption of portions of media content in accordance with some embodiments of the disclosed subject matter.

Turning to FIG. 3, an example 300 of a process for ensuring consumption of portions of media content is shown in accordance with some embodiments of the disclosed subject matter. In some embodiments, process 300 can begin by receiving a request for a media content item from a media content source (e.g., a server acting as a content delivery server).

In response to receiving the request for the media content item, process 300 can request media content from the media content source. In some embodiments, process 300 can send the request for media content to any suitable destination device and/or address and can send the request using any suitable technique of combination of techniques. In some embodiments, user device 110 can execute at least a portion of process 300 to send the request for media content to a content source. In such embodiments, the request for media content can include any suitable information and can be directed to any suitable destination device (e.g., a content server) and/or any suitable address (e.g., a Uniform Resource Locator (URL) associated with the content source). For example, the above-mentioned request for the media content item can include identifying information of the requested media content, identifying information of user device 110 requesting the content (and/or, identifying information of user device 110 for which the content was requested by another user device 110), an address associated with user device 110, any other suitable information, or any suitable combination thereof. Additionally, in some embodiments, the media content being requested can include any suitable media content such as video content, audio content, text content (e.g., a blog post, a link to a web page and/or a portion of a web page, a news story, an electronic book, a document, etc.), any other suitable media content, or any suitable combination of media content.

In some embodiments, the above-mentioned request for the media content item can include a request for one or more particular media content items (e.g., as a request for media content associated with a particular web page and/or media content corresponding to the one or more content items for which identifying information is provided in the request). For example, the request can include a URL corresponding to a particular media content item or media content items. As another example, the request can include one or more identifiers that can be used to identify a particular media content item or media content items. In a more particular example, the request for content can be a request for multiple media content items, such as a playlist of media content items. In another more particular example, the request for media content can be a request for a particular media content item that belongs to a group of multiple media content items (e.g., a particular media content item from a playlist of media content items).

Note that, in some embodiments, in response to the above-mentioned request for the media content item, process 300 can receive the media content as a media content stream from the media content source (e.g., the content delivery server), where the media content stream is unencrypted such that content key information is not needed for decrypting the media content stream. For example, a content delivery server can provide a particular portion of a media content item via an unencrypted media content stream (e.g., the first five minutes of a media content item). In another example, the content delivery server can transmit the media content stream with an indication that content key information is not required to present this portion of the media content item.

Process 300 can receive the media content stream using any suitable technique or combination of techniques, and the media content stream can be formatted as any suitable format of media content stream. For example, process 300 can receive the media content stream as a video stream compressed using any suitable compression technique or combination of techniques, such as techniques associated with the H.264, HEVC, VP8 or VP9 video codecs. As another example, process 300 can receive the media content stream as an audio stream compressed using any suitable compression technique or combination of techniques, such as techniques associated with the MP3, Vorbis, AAC or Opus audio codecs. As yet another example, process 300 can receive the media content stream as a content stream formatted and/or assembled to be transmitted as a bitstream of content using any suitable technique or combination of techniques, such as techniques associated with the MP4, FLV, Matroska, ASF or ISMA formats. As still another example, process 300 can receive the media content stream as a content stream delivered from the content delivery server using any suitable transport protocol, such as techniques associated with the MPEG-DASH, HLS, Smooth Stream, HDS, RTMP or RTP content delivery techniques. As a further example, process 300 can receive the media content stream as a content stream that has been encrypted using any suitable technique or combination of techniques, such as those described in the MPEG Common Encryption Specification ISO/IEC 23001 (sometimes referred to as CENC).

Note that, although the mechanisms described herein for ensuring consumption of portions of media content are generally described in connection with streaming media content, the mechanisms can be used with content delivered using any suitable technique, such as content that is downloaded and played from local storage, content that is encoded on a physical storage medium (e.g., any suitable non-transitory computer-readable medium), etc.

In some embodiments, process 300 can receive metadata associated with the streamlining of the requested media content using any suitable technique or combination of techniques. For example, process 300 can receive information (e.g., a text file, an XML document, etc.) that can indicate which content streams are to be presented at different times in connection with presentation of the requested media content. In such an example, the received information can indicate the order and/or timing at which content streams including portions of the media content and/or advertisements associated with the media content are to be presented by user device 110 for which the media content was requested. In some embodiments, the advertisement streams indicated in the metadata associated with the media content can be selected prior to the information being sent and/or can be selected (e.g., by an advertisement server) in response to a request initiated by user device 110 based on the information in the metadata. In a more particular example, the information that indicates the order and/or timing at which content streams are to be presented by user device 110 can be in any suitable format (e.g., a format associated with the protocol used to transmit the media content stream), such as an m3u8 file associated with HLS content delivery techniques, a Media Presentation Description (MPD) file (e.g., formatted as an XML document) associated with MPEG-DASH content delivery techniques, etc.

In some embodiments, the media content received in the media content stream can be presented using any suitable technique or combination of techniques. For example, a user device (e.g., user device 110) that received the media content stream can decode the media content such that the media content can be presented (e.g., using a display and/or speakers).

Note that, in some embodiments, in response to the above-mentioned request for the media content item, process 300 can request a media license corresponding to the media content item at 302. For example, the request for the media license corresponding to the media content item can be transmitted in response to determining that the received media content stream is encrypted (e.g., such that one or more content keys are needed to decrypt at least a portion of the media content stream).

Figure 4:
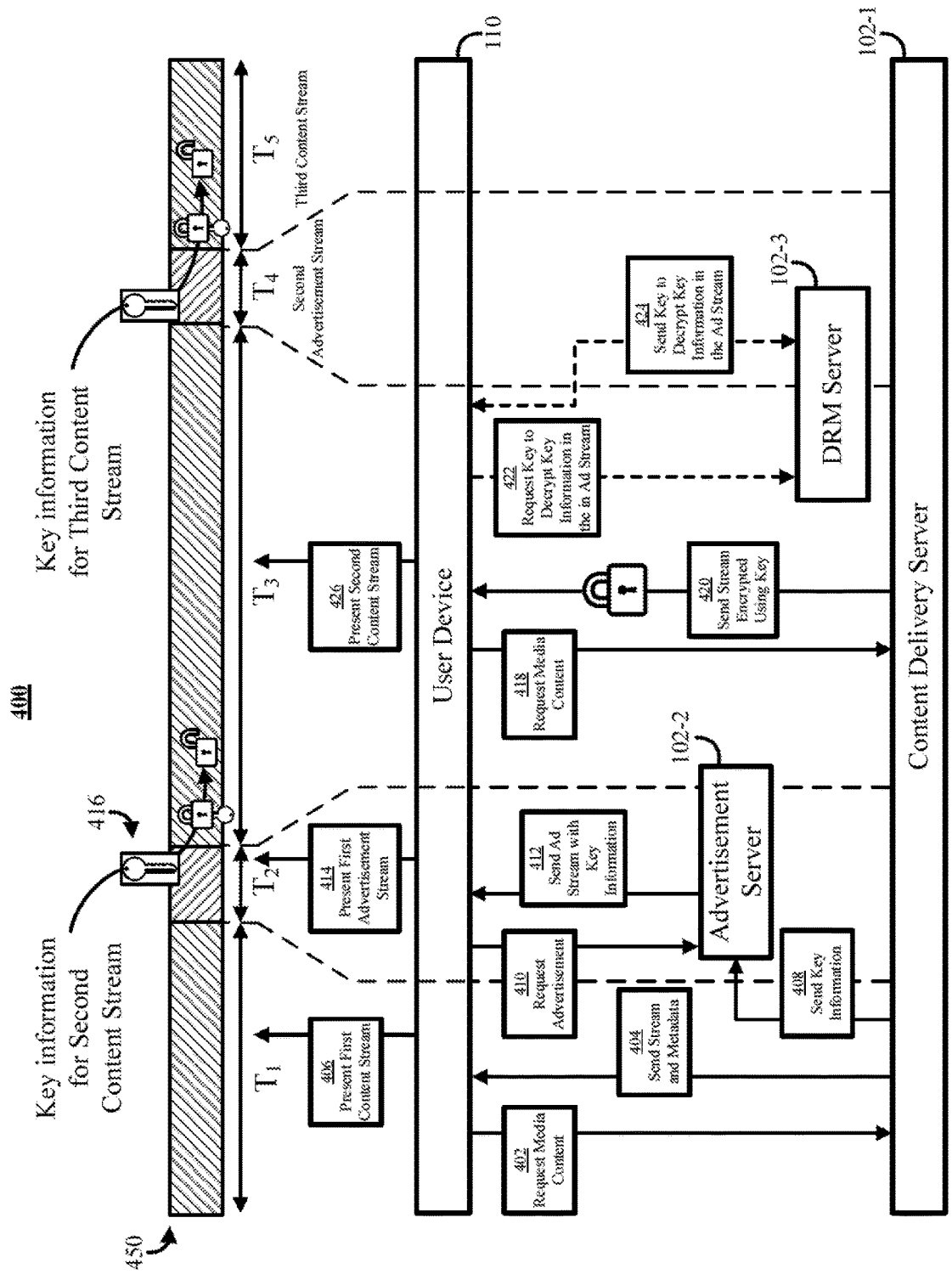
FIG. 4 shows an example of a data flow that can be used in conjunction with the processes described above in connection with FIG. 3 in accordance with some embodiments of the disclosed subject matter.

It should be noted that the request for a media license can include, for example, metadata associated with the media content item, such as title information, video format information, resolution or bit rate, aspect ratio, length information, audio format information, subtitle information, etc. In another example, the request for a media license can include user credential information, such as a user name and a password associated with a user account, and device information, such as a device identifier, device type information, connection information, etc. In a more particular example, as shown in FIG. 4, the media license can be obtained from a digital rights management server (e.g., digital rights management server 102-3 in FIG. 4). In another more particular example, the content delivery server or any other suitable media content source can direct user device 110 to a location, such as an address to a rights management server (e.g., digital rights management server 102-3 in FIG. 4), to obtain the corresponding media license.

In some embodiments, the media license requested at 302 can include one or more media keys or other suitable key information for decrypting an encrypted content stream, such as an advertisement stream, or for decrypting information included in a content stream, such as an encrypted content key information included in an advertisement stream. For example, as explained further below, an advertisement stream can include encrypted content key information. In response to extracting the encrypted content key information from the advertisement stream, the encrypted content key information can be decrypted using the one or more keys included in the media license to obtain unencrypted content key information. Such unencrypted content key information can be used to, for example, decrypt an encrypted media content stream.

It should be noted that, in some embodiments, rather than including one or more keys in the media license to decrypt the encrypted content key information from the advertisement stream, the one or more keys can be inserted in a portion of the advertisement stream. For example, the encrypted content key information can be inserted into a first location of the advertisement stream and the one or more keys for decrypting the content key information can be inserted into a second location of the advertisement stream.

At 304, in some embodiments, process 300 can request an advertisement from an advertisement source at a time that is determined based on the information received with the media content stream. In some embodiments, process 300 can request the advertisement from any suitable advertisement source using any suitable technique or combination of techniques. For example, process 300 can use the information provided with the media content stream to request an advertising stream from an address specified by the information provided with the media content stream. As another example, process 300 can use the information provided with the media content stream to request an advertisement stream from the same source from which the media content stream was requested. In some embodiments, process 300 can request a particular advertisement based on the information provided with the media content stream. Alternatively, process 300 can request that an advertisement be provided, and the source of the advertisement stream can select and send an advertisement stream based on, for example, information provided by a user device (e.g., user device 110) that sent the request for the advertisement.

Process 300 can receive, in response to the request for the advertisement at 304, an advertisement stream that includes key information that can be used to decrypt a subsequent media content stream. In some embodiments, process 300 can receive the advertisement stream using any suitable technique or combination of techniques, and the advertisement stream can be formatted as any suitable format of advertisement stream. For example, the advertisement stream can be received and formatted as described above in connection with receiving the media content stream.

In some embodiments, the key information included with the advertisement stream can be any suitable key information. For example, the key information can be one or more keys that can be used to decrypt a portion of the media content included a media content stream, such as a subsequent portion of the media content included in a subsequent media content stream. In such an example, the key information may or may not itself be encrypted. In a more particular example, the one or more keys that can be used to decrypt the portion of the media content can be encrypted prior to being included in the advertisement stream such that the user device that receives the key information needs another key (e.g., obtained from a digital rights management system) to decrypt the key information in order to ultimately decrypt the portion of the media content. In some embodiments, the key information can be encrypted using a digital rights management key, such that user device 110 can use a corresponding digital rights management key retrieved from a digital rights management system to decrypt the key information included in the advertisement stream. For example, as described above in connection with the request for a media license, the digital rights management key can be included within a media license retrieved from a digital rights management server. In another example, alternatively to including the digital rights management key within the media license, the digital rights management key can be included at a different location within the advertisement stream (e.g., such that the content stream can be decrypted without obtaining a media license or any other suitable DRM license from a digital rights management server).

As another example, the key information can be information necessary to retrieve a key that can be used to decrypt a subsequent portion of the media content. In such an example, the key information included in the advertisement stream can include information required to retrieve a key from a digital rights management system.

In some embodiments, the key information included in the advertisement stream can be included in the advertisement stream using any suitable technique or combination of techniques. For example, the key information can be included in a Protection System Specific Header (pssh) box sent with the advertisement stream (e.g., in cases in which the advertisement stream is sent using the MPEG-DASH protocol). As another example, the key information can be included in a Common Encryption Protection System Specific Header (cenc:pssh) sent as part of the advertisement stream (e.g., in cases in which the advertisement stream is sent using the MPEG-DASH protocol).

As yet another example, the key information can be stegenographically encoded within the content in the advertisement stream. In a more particular example, the key information can be stegenographically hidden within audio content and/or video content, such that user device 110 having an appropriate key to decode the stegenographically encoded information, can retrieve the key information from the received advertisement stream.

In some embodiments, the key information can be included in any suitable portion of the advertisement stream. For example, the key information can be included near the end of the advertisement stream such that a substantial portion (e.g., at least half, at least three-quarters, substantially the entirety) of the advertisement stream must be received before the key information can be extracted. As another example, the key information can be included in a middle portion of the advertisement stream, which can facilitate skipping of the advertisement after at least a portion preceding the location of the key information has been presented. In yet another example, encrypted content key information can be included in one portion of the advertisement stream, such that a substantial portion of the advertisement stream is received before the encrypted content key information can be extracted and one or more keys that decrypt the encrypted content key information can be included in another portion of the advertisement stream.

In some embodiments, policy information relating to the content key information can be included in the advertisement stream. Such policy information can, for example, define a policy on how to use the content key information— e.g., a key duration, a key expiration time, device requirements, etc. It should be noted that content key information and associated policy information can be stored in different locations within the advertisement stream. It should also be noted that content key information and associated policy information can be stored in different content streams.

In some embodiments, the advertisement received in the advertisement stream can be presented using any suitable technique or combination of techniques. For example, a user device (e.g., user device 110) that received the advertisement stream can decode the advertisement such that the advertisement can be presented (e.g., using a display and/or speakers). Note that, in some embodiments, multiple advertisements can be requested and/or received at 306 and/or 308, and that the key information (or portions of the key information can be included in any or all of the advertisements that are to be presented between adjacent portions of a media content item.

At 306, process 300 can extract the key information included in the advertisement stream received in response to the request at 304. In some embodiments, process 300 can extract the key information included in the advertisement using any suitable technique or combination of techniques. For example, process 300 can extract information from any pssh box included in the advertisement stream, and determine whether that information is the content key information for one or more portions of the media content (e.g., a first portion of the media content item, a subsequent portion of the media content item following an unencrypted portion of the media content item, etc.). As another example, process 300 can extract key information that is stegenographically encoded in the content using any suitable key, such as a digital rights management key, a private key associated with the user device (e.g., user device 110) executing process 300, and/or any other suitable information.

In some embodiments, some information needed to extract the key information such as where the key information is located, how to identify the key information, etc., can be communicated with the advertisement stream, with the media content stream, and/or using any other suitable communication channel.

At 308, process 300 can decrypt the encrypted content key information extracted from the advertisement stream if the content key information was received in an encrypted form. In some embodiments, process 300 can decrypt the key information using any suitable technique or combination of techniques. For example, as described above in connection with 308, the key information can be decrypted by retrieving a key included in a media license from a digital rights management system, and then using that key to decrypt the key information, which may be one or more content keys that can be used to decrypt a subsequent portion of the media content.

As described above, at 310, process 300 can transmit a request for a media content item from a media content source (e.g., a server acting as a content delivery server). This can be, for example, a first request for a media content item from a media content source in response to selecting a media content item for presentation or a subsequent request for the media content item in response to playing back an unencrypted portion of the media content item.

As also described above, at 312, process 300 can receive the media content as an encrypted media content stream from the media content source (e.g., the content delivery server) in response to the request. For example, the media content stream can include a first portion of the media content item that is in an encrypted form. In another example, the encrypted media content stream can include a subsequent portion of the media content item that follows the presentation of an unencrypted portion of the media content item.

As also described above, process 300 can receive or continue to receive the media content stream using any suitable technique or combination of techniques, and the media content stream can be formatted as any suitable format of media content stream. For example, process 300 can receive the media content stream as a video stream compressed using any suitable compression technique or combination of techniques, such as techniques associated with the H.264, HEVC, VP8 or VP9 video codecs. As another example, process 300 can receive the media content stream as an audio stream compressed using any suitable compression technique or combination of techniques, such as techniques associated with the MP3, Vorbis, AAC or Opus audio codecs. As yet another example, process 300 can receive the media content stream as a content stream formatted and/or assembled to be transmitted as a bitstream of content using any suitable technique or combination of techniques, such as techniques associated with the MP4, FLV, Matroska, ASF or ISMA formats. As still another example, process 300 can receive the media content stream as a content stream delivered from the content delivery server using any suitable transport protocol, such as techniques associated with the MPEG-DASH, HLS, Smooth Stream, HDS, RTMP or RTP content delivery techniques. As a further example, process 300 can receive the media content stream as a content stream that has been encrypted using any suitable technique or combination of techniques, such as those described in the MPEG Common Encryption Specification ISO/IEC 23001 (sometimes referred to as CENC).

Note that, although the mechanisms described herein for ensuring consumption of portions of media content are generally described in connection with streaming media content, the mechanisms can be used with content delivered using any suitable technique, such as content that is downloaded and played from local storage, content that is encoded on a physical storage medium (e.g., any suitable non-transitory computer-readable medium), etc.

In some embodiments, as described above, process 300 can receive metadata associated with the streamlining of the requested media content using any suitable technique or combination of techniques. For example, process 300 can receive information (e.g., a text file, an XML document, etc.) that can indicate which content streams are to be presented at different times in connection with presentation of the requested media content. In such an example, the received information can indicate the order and/or timing at which content streams including portions of the media content and/or advertisements associated with the media content are to be presented by user device 110 for which the media content was requested. In some embodiments, the advertisement streams indicated in the metadata associated with the media content can be selected prior to the information being sent and/or can be selected (e.g., by an advertisement server) in response to a request initiated by user device 110 based on the information in the metadata. In a more particular example, the information that indicates the order and/or timing at which content streams are to be presented by user device 110 can be in any suitable format (e.g., a format associated with the protocol used to transmit the media content stream), such as an m3u8 file associated with HLS content delivery techniques, a Media Presentation Description (MPD) file (e.g., formatted as an XML document) associated with MPEG-DASH content delivery techniques, etc.

In some embodiments, the media content received in the media content stream can be presented using any suitable technique or combination of techniques. For example, a user device (e.g., user device 110) that received the media content stream can decode the media content such that the media content can be presented (e.g., using a display and/or speakers).

In some embodiments, process 300 can receive another (e.g., subsequent) media content stream that includes a portion of the media content other than the media content included in the media content stream received prior to the advertisement stream being received. In some embodiments, process 300 can receive the subsequent media content stream using any suitable technique or combination of techniques, and the subsequent media content stream can be formatted as any suitable format of media content stream.

At 314, process 300 can decrypt the encrypted media content received in the media content stream. As discussed above in connection with 306 and 308, the key information included in the advertisement stream can be one or more content keys that can be used to decrypt the media content received in the media content stream at 314 (whether the key information is encrypted or unencrypted) and/or the key information in the advertisement stream can be used to retrieve one or more keys that can be used to decrypt the media content received at 314 in the subsequent stream of media content. In some embodiments, process 300 can use any suitable technique or combination of techniques to decrypt the media content. In some embodiments, the media content received at 312 in the media content stream and decrypted at 314 can be presented using any suitable technique or combination of techniques. For example, a user device (e.g., user device 110) that received the media content stream can decode and decrypt the media content such that the media content can be presented (e.g., using a display and/or speakers).

In some embodiments described herein, although the media content stream received at 312 can be encrypted while a previously received portion of the media content stream received can be unencrypted, it should be noted that the previously received media content stream received can be encrypted using any suitable technique or combination of techniques. In some embodiments, one or more keys required to decrypt the media content received in the media content stream at 312 can be received in a pre-roll advertisement, an overlay advertisement, in a media license from a digital rights management system (e.g., unrelated to the presentation of any advertisement), or from any other suitable source. Additionally, the media content received at 312 can be received without encryption.

In some embodiments, an advertisement stream and/or a content stream can include any suitable number of keys. In such embodiments, one or more of the keys may be encrypted such that a user device (e.g., user device 110) is required to have access to another key (e.g., a DRM key) to decrypt a key received in the advertisement stream and/or content stream, which, once decrypted, can be used to decrypt another subsequently received key. In some embodiments, an advertisement stream and/or a content stream can include multiple keys, which are each required, in turn, to decrypt subsequent keys can inhibit skipping of substantial portions of the advertisement stream and/or content stream which may be possible when only a single key is included. In some embodiments, an advertisement stream and/or a content stream can include multiple keys which are inserted at particular locations within the stream.

In response to decrypting the encrypted media content stream using the content key information from the advertisement stream such that the media content can be presented (e.g., using a display and/or speakers), process 300 can return to 302 to obtain a media license (e.g., in response to the media license that was obtained at 302 expiring, in response selecting a different media content item, etc.) and/or return to 304 to request an advertisement stream from an advertisement source (e.g., to obtain content key information for subsequent portions of the encrypted media content stream).

FIG. 4 shows an example 400 of a data flow that can be used in conjunction with the processes described above in connection with FIG. 3 in accordance with some embodiments of the disclosed subject matter. At 402, user device 110 can request media content from content delivery server 102-1. In some embodiments, the request sent by user device 110 at 402 can be sent by user device 110 in any suitable context. For example, user device 110 can receive user input (e.g., via a user interface such as a program guide) specifying that user device 110 is to request a particular media content item or media content items (e.g., as a playlist of media content items) corresponding to a user interface element selected via the user input. In such an example, user device 110 can request media content from a content source associated with the selected media content item(s) based on information associated with the selected media interface element (e.g., identifying information of the media content item or media content items, a source of the media content item or media content items, etc.). In another example, user device 110 can begin playing back a media content item that is received in the form of an unencrypted media stream and can transmit a subsequent request to content delivery server 102-1 in response to being at or near the end of the unencrypted media content stream, where the response to the request can be received in the form of an encrypted media content stream.

As another example, user device 110 can receive user input (e.g., via a user interface such as a program guide) or through an input device (e.g., a remote control) to tune to a different channel that corresponds to a particular media content stream. In such an example, user device 110 can request media content from a content source associated with the selected channel.

As yet another example, user device 110 can request one or more media content items based on a media content item that is currently being presented or a media content item that has just finished being presented. In a more particular example, user device 110 can request a next media content item in a series of media content items (e.g., a next episode in a television series) when a currently presented media content item is about to end and/or after the media content item has finished being presented. In such an example, user device 110 can request media content from a content source associated with the next media content item.

As still another example, user device 110 can request unspecified content from a content source, such as one or more media content items based on a search query, one or more recommended media content items based on any suitable factor(s) (e.g., based on previously consumed media content items). In such an example, user device 110 can request media content from a content source associated with a search function, a recommendation function, etc.

At 404, content delivery server 102-1 can send a media content stream in response to the request for media content sent by user device 110 at 402. Content delivery server 102-1 can send the media content stream using any suitable technique or combination of techniques, such as techniques described above in connection with 304 of FIG. 3. In some embodiments, the media content stream sent at 404 can be encrypted or unencrypted. Additionally, in some embodiments in which the media content stream sent at 404 is encrypted, key information for decrypting the content can be communicated to user device 110 at any suitable time and/or from any suitable source of key information (e.g., digital rights management server 102-3 described below). As described above in connection with 304, the media content stream sent at 404 by content delivery server 102-1 can be associated with metadata that can indicate which content streams are to be presented by user device 110 at different times. In reference to the example shown in FIG. 4, the metadata can indicate that the first media content stream is to be presented during period $T_1$, that a first advertising stream is to be presented during period $T_2$, that a second media content stream is to be presented during period $T_3$, etc. Additionally, in some embodiments, the metadata can indicate a source of the media content stream(s) and/or the source of the advertisement stream(s) from which content is to be requested.

At 406, user device 110 can present media content sent by content delivery server 102-1 at 404. As described above in connection with 304, user device 110 can decode, decrypt, and/or perform any other operations necessary to transform the media content stream sent by content delivery server 102-1 into content that is suitable for presentation (e.g., using a display and/or speakers). In FIG. 4, content presented by user device 110 is represented by presentation 450. As shown, during period $T_1$, user device 110 is presenting the first content stream sent at 404 by content delivery server 102-1.

At 408, content delivery server 408 can send key information for decrypting a second content stream to be presented after a first advertisement to an advertisement server 102-2 that is to send an advertisement stream to user device 110. In some embodiments, the key information can be encrypted or unencrypted, and can be used to decrypt a subsequent media content stream. Additionally, in some embodiments, content delivery server 102-1 can identify the key information as being intended for a particular user device (e.g., user device 110) and/or for decrypting particular media content (e.g., the second content stream that is to be presented during time period $T_3$).

Although the key information is shown in FIG. 4 as being sent by content delivery server 102-1 to advertisement server 102-2, the key information can be stored by any suitable server that is capable of causing the key information to be conveyed to user device 110 with the advertisement stream. For example, if content deliver server 102-1 is responsible for sending both the first media content stream and the first advertisement stream to user device 110, content delivery server 102-1 can store the key information until user device 110 requests the first advertisement stream, and can include the key information with the first advertisement stream. As another example, the key information can be stored by a key information server (not shown), and the advertisement request (e.g., as described below in connection with 410) can be directed to the key information server, which can redirect the request to advertisement server 102-2 and include the key information as information that is to be delivered with the requested advertisement.

As described above in connection with 308, the key information can include any suitable key information that can be used to decrypt the media content sent by content server 102-1 in the subsequent media content stream.

At 410, user device 110 can request an advertisement that is to be presented between two media content streams. As described above in connection with 306 of FIG. 3, the request for the advertisement can submitted based on metadata associated with the first media content stream sent by content delivery server 102-1 at 404.

At 412, advertisement server 102-2 can send an advertisement stream that includes key information for media content to be sent in a subsequent media content stream to user device 110 in response to the request sent by user device 110 at 410. As described above in connection with 308 of FIG. 3, the advertisement stream can be sent using any suitable technique or combination of techniques. Note that although the request for the advertisement stream sent by user device 110 at 410 and the advertisement stream sent by advertisement server 102-2 are shown in FIG. 4 as being sent during time period $T_2$, this is merely shown for convenience and the transmission of the advertisement stream can be initiated during time period $T_1$ while the first media content stream is still being presented, and/or at any other suitable time.

At 414, user device 110 can present the content of the first advertisement stream during at least a portion of time period $T_2$ shown in FIG. 4. As described above in connection with 406 and with 304 of FIG. 3, user device 110 can decode, decrypt, and/or perform any other operations necessary to transform the advertisement stream sent by advertisement server 102-2 into content that is suitable for presentation (e.g., using a display and/or speakers).

As discussed above in connection with 412 and with 308 of FIG. 3, the advertisement stream can include key information, which is represented in FIG. 4 by key icon 416. As shown in FIG. 4, the key information in the first advertisement stream is associated with a portion of the advertisement stream that is to be presented near the end of time period $T_2$.

At 418, user device 110 can request the second media content stream from content delivery server 102-1. As described above in connection with 402, user device 110 can use any suitable technique or combination of techniques to request the second media content stream. In some embodiments, user device 110 can request the second media content stream based on the information received in connection with the first media content stream instructing user device 110 on the order and/or timing at which content streams are to be presented by user device 110.

At 420, content delivery server 102-1 can send the second media content stream in response to the request for media content sent by user device 110 at 418. As described above in connection with 404, content delivery server 102-1 can use any suitable technique or combination of techniques to send the second media content stream. In some embodiments, content delivery server 102-1 can send the second media content stream with the media content encrypted using a key corresponding to the key obtained by user device 110 from the key information included in the advertisement stream, such that user device 110 can decrypt and present the media content included in the second media content stream if it obtained the key information from the advertisement stream.

At 422, if the key information included in the advertisement stream is itself encrypted, user device 110 can request a key that can be used to decrypt the key information obtained from the first advertisement stream from a digital rights management server 102-3. For example, user device 110 can request a media license associated with the media content item from digital rights management server 102-3 and, in response to receiving the media license corresponding to the media content item, extracting the key information from the media license where the extracted key information can be used to decrypt the key information obtained from the first advertisement stream. In another example, user device 110 can obtain the keys needed to decrypt the key information obtained from the first advertisement stream from a different location within the first advertisement stream (e.g., such that a media license from digital rights management server 102-3 is not needed). Additionally or alternatively, if the key information includes information needed to obtain the content key for decrypting the media content in the second media content stream, user device 110 can request the content key that can be used to decrypt the media content in the second media content stream from digital rights management server 102-3 based on the key information.

In some embodiments, additionally to obtaining content key information (e.g., premium content stream keys) from the first advertisement stream, user device 110 can extract, from the first advertisement stream, policy information corresponding to the content key information that is also included in the first advertisement stream. Such policy information can, for example, define a policy on how to use the content key information—e.g., a key duration, a key expiration time, device requirements, etc. It should be noted that content key information and associated policy information can be stored in different locations within the first advertisement stream. It should also be noted that content key information and associated policy information can be stored in different content streams.

At 424, digital rights management server 102-3 can return the requested key to user device 110, if user device 110 provided information required by digital rights management server 102-3 in order to send the key, such as credentials (e.g., username, password, etc.), a security certificate, identifying information of user device 110, correct identifying information of the key being requested, etc.

At 426, user device 110 can present the second content stream during at least a portion of time period $T_3$. As described above in connection with 406 and 316 of FIG. 3, user device 110 can decode, decrypt, and/or perform any other operations necessary to transform the second media content stream sent by content delivery server 102-1 into content that is suitable for presentation (e.g., using a display and/or speakers) using the key obtained from the advertisement stream and/or from digital rights management server 102-3.

In some embodiments, the mechanisms described herein can include server-side software, client-side software, server-side hardware, client-side hardware, firmware, or any suitable combination thereof. For example, these mechanisms can encompass one or more web pages or web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes one or more processors (such as hardware processor 212 and/or hardware processor 222) to execute the mechanisms described herein. For instance, these mechanisms can encompass a computer program written in a programming language recognizable by user device 110 and/or server 102 that is executing the mechanisms (e.g., a program written in a programming language, such as, Java, C, Objective-C, C++, C#, JavaScript, Visual Basic, HTML, XML, ColdFusion, any other suitable approaches, or any suitable combination thereof).

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), random access memory (RAM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the processes of FIGS. 3 and 4 can be executed or performed in any order or sequence not limited to the order and sequence shown and described in the figures. Also, some of the above steps of the processes of FIGS. 3 and 4 can be executed or performed substantially simultaneously where appropriate or in parallel to reduce latency and processing times. Furthermore, it should be noted that FIGS. 3 and 4 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for ensuring consumption of portions of media content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for ensuring media consumption, the method comprising:
   receiving, using a hardware processor, an encrypted media content stream from a media content source that includes first media content corresponding to at least a portion of a media content item;
   determining that the media content stream received from the media content source is encrypted;
   in response to determining that the media content stream received from the media content source is encrypted, requesting a media content license corresponding to the media content item, wherein the media content license includes a key;
   requesting a second media content stream that includes second media content having a playback position adjacent to the first media content, wherein the second media content stream includes encrypted content key information inserted at a first time position that corresponds with an end portion of the second media content stream for decrypting the encrypted media content stream and key policy information that indicates a manner in which the encrypted content key information is to be used inserted at a second time position that also corresponds with the end portion of the second media content stream, and wherein the first time position and the second time position are different time positions within the second media content stream;
   causing the second media content stream to be presented;
   extracting the encrypted content key information during presentation of the second media content stream upon reaching the first time position within the second media content stream and the key policy information during presentation of the second media content stream upon reaching the second time position within the second media content stream;
   decrypting the encrypted content key information included in the second media content stream using the key from the requested media license to obtain decrypted content key information, wherein the decrypted content key information includes at least one content key for decrypting the encrypted media content stream;
   decrypting the encrypted media content stream using the at least one content key extracted from the decrypted content key information included in the second media content stream and based on the key policy information extracted from the second media content stream; and
   causing the decrypted media content stream to be presented.

2. The method of claim 1, wherein the media license is requested from a digital rights management system and wherein the second media content stream is an advertisement stream requested from an advertising source.

3. The method of claim 1, wherein the second media content stream is streamed using the MPEG Dynamic Adaptive Streaming Over HTTP protocol and wherein the encrypted content key information is contained in a Protection System Specific Header box included in the second media content stream.

4. The method of claim 1, further comprising:
   receiving a request for the media content item;
   requesting the media content item from the media content source;
   in response to the request for the media content item, receiving an unencrypted third media content stream from the media content source that includes third media content corresponding to at least a portion of the requested media content item, wherein the third media content is to be presented prior to presentation of the first media content and wherein the first media content is to be presented after presentation of the second media content; and
   causing the third media content to be presented by a display.

5. A system for ensuring media consumption, the system comprising:
   a memory; and
   a hardware processor that, when executing computer-executable instruction stored in the memory, is programmed to:
      receive an encrypted media content stream from a media content source that includes first media content corresponding to at least a portion of a media content item;
      determine that the media content stream received from the media content source is encrypted;
      in response to determining that the media content stream received from the media content source is encrypted, request a media content license corresponding to the media content item, wherein the media content license includes a key;
      request a second media content stream that includes second media content having a playback position adjacent to the first media content, wherein the second media content stream includes encrypted content key information inserted at a first time position that corresponds with an end portion of the second media content stream for decrypting the encrypted media content stream and key policy information that indicates a manner in which the encrypted content key information is to be used inserted at a second time position that also corresponds with the end portion of the second media content stream, and wherein the first time position and the second time position are different time positions within the second media content stream;

cause the second media content stream to be presented;

extract the encrypted content key information during presentation of the second media content stream upon reaching the first time position within the second media content stream and the key policy information during presentation of the second media content stream upon reaching the second time position within the second media content stream;

decrypt the encrypted content key information included in the second media content stream using the key from the requested media license to obtain decrypted content key information, wherein the decrypted content key information includes at least one content key for decrypting the encrypted media content stream;

decrypt the encrypted media content stream using the at least one content key extracted from the decrypted content key information included in the second media content stream and based on the key policy information extracted from the second media content stream; and cause the decrypted media content stream to be presented.

6. The system of claim 5, wherein the media license is requested from a digital rights management system and wherein the second media content stream is an advertisement stream requested from an advertising source.

7. The system of claim 5, wherein the second media content stream is streamed using the MPEG Dynamic Adaptive Streaming Over HTTP protocol and wherein the encrypted content key information is contained in a Protection System Specific Header box included in the second media content stream.

8. The system of claim 5, wherein the hardware processor is further programmed to:

receive a request for the media content item;

request the media content item from the media content source;

in response to the request for the media content item, receive an unencrypted third media content stream from the media content source that includes third media content corresponding to at least a portion of the requested media content item, wherein the third media content is to be presented prior to presentation of the first media content and wherein the first media content is to be presented after presentation of the second media content; and cause the third media content to be presented by a display.

9. A non-transitory computer-readable medium containing computer executable instructions that, when executed by a processor, cause the processor to perform a method for ensuring media consumption, the method comprising:

receiving an encrypted media content stream from a media content source that includes first media content corresponding to at least a portion of a media content item;

determining that the media content stream received from the media content source is encrypted;

in response to determining that the media content stream received from the media content source is encrypted, requesting a media content license corresponding to the media content item, wherein the media content license includes a key;

requesting a second media content stream that includes second media content having a playback position adjacent to the first media content, wherein the second media content stream includes encrypted content key information inserted at a first time position that corresponds with an end portion of the second media content stream for decrypting the encrypted media content stream and key policy information that indicates a manner in which the encrypted content key information is to be used inserted at a second time position that also corresponds with the end portion of the second media content stream, and wherein the first time position and the second time position are different time positions within the second media content stream;

causing the second media content stream to be presented;

extracting the encrypted content key information during presentation of the second media content stream upon reaching the first time position within the second media content stream and the key policy information during presentation of the second media content stream upon reaching the second time position within the second media content stream;

decrypting the encrypted content key information included in the second media content stream using the key from the requested media license to obtain decrypted content key information, wherein the decrypted content key information includes at least one content key for decrypting the encrypted media content stream;

decrypting the encrypted media content stream using the at least one content key extracted from the decrypted content key information included in the second media content stream and based on the key policy information extracted from the second media content stream; and causing the decrypted media content stream to be presented.

10. The non-transitory computer-readable of claim 9, wherein the media license is requested from a digital rights management system and wherein the second media content stream is an advertisement stream requested from an advertising source.

11. The non-transitory computer-readable of claim 9, wherein the second media content stream is streamed using the MPEG Dynamic Adaptive Streaming Over HTTP protocol and wherein the encrypted content key information is contained in a Protection System Specific Header box included in the second media content stream.

12. The non-transitory computer-readable of claim 9, wherein the method further comprises:

receiving a request for the media content item;

requesting the media content item from the media content source;

in response to the request for the media content item, receiving an unencrypted third media content stream from the media content source that includes third media content corresponding to at least a portion of the requested media content item, wherein the third media content is to be presented prior to presentation of the first media content and wherein the first media content is to be presented after presentation of the second media content; and causing the third media content to be presented by a display.

* * * * *